United States Patent
Ohkoshi et al.

(10) Patent No.: US 8,857,258 B2
(45) Date of Patent: Oct. 14, 2014

(54) INERTIAL FORCE SENSOR

(75) Inventors: Hideo Ohkoshi, Osaka (JP); Shigehiro Yoshiuchi, Kyoto (JP); Tsuyoshi Sakaue, Hyogo (JP)

(73) Assignee: Panasonic Corporation, Osaka (JP)

( * ) Notice: Subject to any disclaimer, the term of this patent is extended or adjusted under 35 U.S.C. 154(b) by 648 days.

(21) Appl. No.: 13/143,099

(22) PCT Filed: Feb. 16, 2010

(86) PCT No.: PCT/JP2010/000929
§ 371 (c)(1),
(2), (4) Date: Jul. 1, 2011

(87) PCT Pub. No.: WO2010/095412
PCT Pub. Date: Aug. 26, 2010

(65) Prior Publication Data
US 2011/0271760 A1    Nov. 10, 2011

(30) Foreign Application Priority Data

Feb. 18, 2009 (JP) ................................. 2009-034958

(51) Int. Cl.
G01C 19/00 (2013.01)
G01C 19/5769 (2012.01)
G01C 19/574 (2012.01)
G01P 15/18 (2013.01)
G01P 15/125 (2006.01)
G01P 15/08 (2006.01)

(52) U.S. Cl.
CPC ............ *G01P 15/18* (2013.01); *G01C 19/5769* (2013.01); *G01C 19/574* (2013.01); *G01P 2015/0845* (2013.01); *G01P 15/125* (2013.01); *G01P 2015/0857* (2013.01)
USPC ...................................... 73/504.12

(58) Field of Classification Search
CPC .............. G01C 19/574; G01C 19/5769; G01P 2015/0845; G01P 2015/0857
USPC ................ 73/504.02, 504.04, 504.13–504.16
See application file for complete search history.

(56) References Cited

U.S. PATENT DOCUMENTS 6,058,020 A * 5/2000 Winterer et al. ............... 361/767
6,205,857 B1 * 3/2001 Nakajima ................... 73/504.16

(Continued)

FOREIGN PATENT DOCUMENTS

JP    2004-354169    12/2004
JP    2005-106481    4/2005

(Continued)

OTHER PUBLICATIONS

International Search Report of PCT Application No. PCT/JP2010/000929 dated May 18, 2010.

*Primary Examiner* — Peter Macchiarolo
*Assistant Examiner* — Samir M Shah
(74) *Attorney, Agent, or Firm* — Panasonic Patent Center

(57) ABSTRACT

An inertial force sensor includes a detector element, a supporting body supporting the detector element, and a case holding the detector element via the first supporting body. The supporting body has flexibility and has a plate shape. The detector element includes a weight, a flexible coupling portion extending along a plane and supporting the weight, a fixing portion holding the weight via the coupling portion, and a detector detecting angular velocities about at least two axes non-parallel to each other. The supporting body extends in parallel with the plane from the detector element, and bends at a bending portion in a direction away from the plane. This inertial force sensor can detect the angular velocities while preventing erroneous detection caused by external impacts and vibrations.

10 Claims, 14 Drawing Sheets

(56) References Cited

U.S. PATENT DOCUMENTS

| | | | |
|---|---|---|---|
| 6,227,048 B1* | 5/2001 | Kikuchi et al. | 73/504.12 |
| 6,472,798 B2* | 10/2002 | Kishimoto | 310/344 |
| 6,534,900 B2* | 3/2003 | Aigner et al. | 310/326 |
| 6,698,292 B2* | 3/2004 | Kikuchi | 73/662 |
| 6,708,564 B2* | 3/2004 | Ishikawa et al. | 73/493 |
| 7,000,472 B2* | 2/2006 | Kinoshita | 73/504.12 |
| 7,057,331 B2* | 6/2006 | Shimodaira et al. | 310/344 |
| 7,091,651 B2* | 8/2006 | Kinoshita | 310/365 |
| 7,145,283 B2* | 12/2006 | Takeuchi et al. | 310/348 |
| 7,145,416 B2* | 12/2006 | Mizuno | 333/186 |
| 7,157,836 B2* | 1/2007 | Kinoshita | 310/348 |
| 7,278,313 B2* | 10/2007 | Hayashi et al. | 73/504.12 |
| 7,334,473 B2* | 2/2008 | Hayashi et al. | 73/504.12 |
| 7,714,421 B2* | 5/2010 | Kim et al. | 257/678 |
| 7,788,978 B2* | 9/2010 | Ishikawa et al. | 73/504.12 |
| 8,166,827 B2* | 5/2012 | Miyoshi et al. | 73/727 |
| 8,309,385 B2* | 11/2012 | Matsunaga et al. | 438/51 |
| 8,432,007 B2* | 4/2013 | Leidl et al. | 257/416 |
| 8,434,363 B2* | 5/2013 | Ishikawa et al. | 73/504.12 |
| 8,474,316 B2 | 7/2013 | Blomqvist | |
| 8,582,788 B2* | 11/2013 | Leidl et al. | 381/173 |
| 8,633,632 B2* | 1/2014 | Oda et al. | 310/323.16 |
| 2001/0020388 A1* | 9/2001 | Inoue et al. | 73/514.12 |
| 2002/0047501 A1* | 4/2002 | Tsuda et al. | 310/348 |
| 2003/0141340 A1* | 7/2003 | Ishikawa et al. | 228/4.5 |
| 2004/0155560 A1* | 8/2004 | Koike et al. | 310/348 |
| 2005/0040734 A1* | 2/2005 | Kinoshita | 310/348 |
| 2005/0116794 A1* | 6/2005 | Mizuno | 333/187 |
| 2005/0262940 A1* | 12/2005 | Kinoshita | 73/504.02 |
| 2006/0082260 A1* | 4/2006 | Kinoshita | 310/348 |
| 2006/0238080 A1* | 10/2006 | Koyama et al. | 310/348 |
| 2006/0267458 A1 | 11/2006 | Ishikawa et al. | |
| 2009/0100929 A1 | 4/2009 | Ohkoshi | |
| 2009/0320594 A1 | 12/2009 | Ohuchi et al. | |
| 2013/0300806 A1* | 11/2013 | Nakayama | 347/68 |

FOREIGN PATENT DOCUMENTS

| | | |
|---|---|---|
| JP | 2005-292079 | 10/2005 |
| JP | 2005-345354 | 12/2005 |
| JP | 2006-3336 | 1/2006 |
| JP | 2006-029799 | 2/2006 |
| JP | 2007-101562 | 4/2007 |
| JP | 2008-46058 | 2/2008 |
| JP | 2008-151633 | 7/2008 |
| JP | 2008-232703 | 10/2008 |
| JP | 2008-281586 | 11/2008 |
| WO | 2005/047820 | 5/2005 |
| WO | 2006/132277 | 12/2006 |

* cited by examiner

INERTIAL FORCE SENSOR

CROSS-REFERENCE TO RELATED APPLICATIONS

This application is a U.S. national stage application of the PCT international application No. PCT/JP2010/000929

TECHNICAL FIELD

The present invention relates to an inertial force sensor capable of detecting angular velocity, which is used in various electronic devices for attitude control or navigation of movable objects, such as aircrafts, automobiles, robots, boats, ships, and vehicles.

BACKGROUND ART

An inertial force sensor, such as an angular velocity sensor and an acceleration sensor, detects angular velocity, acceleration, or both of them.

In order to detect axial components of an acceleration along an X-axis, a Y-axis, and a Z-axis which are perpendicular to each other, total three acceleration sensors: an acceleration detector element for detecting acceleration in a direction of the X-axis; an acceleration detector element for detecting acceleration in a direction of the Y-axis; and an acceleration detector element for detecting acceleration in a direction of the Z-axis. Angular velocities about the axes can be detected by total three angular-velocity detector elements: an angular-velocity detector element for detecting angular velocity about the X-axis; an angular-velocity detector element for detecting angular velocity about the Y-axis; and an angular-velocity detector element for detecting angular velocity about the Z-axis.

It is, however, difficult to reduce the size of a sensor which includes plural detector elements that detect acceleration in plural axis directions and angular velocities about plural axes.

Patent Literature 1 discloses a conventional inertial force sensor in which one detector element detects acceleration in plural axis directions or angular velocities about plural axes. This inertial force sensor includes a weight, a fixing portion for holding the weight, and a coupling portion for connecting the weight to the fixing portion. The weight has a mass large enough to detect inertial forces. The coupling portion has flexibility and detects the inertial forces based on deformations thereof or variations in location of the weight, which are caused by the inertial forces applied to the weight.

Patent Literature 2 discloses a conventional vibration-isolation structure of an inertial force sensor that detects angular velocities. The vibration-isolation structure includes an elastic body that can easily warp in a direction in which a Coriolis force occurs.

In the conventional inertial force sensors described above, it is difficult to provide a vibration-isolation structure for one detector element that detects angular velocities about plural axes. For example, while the weight of the detector element is driven to vibrate in an X-axis direction, an angular velocity about a Z-axis generates a Coriolis force which acts on the weight in a Y-axis direction to cause a coupling portion to deflect. The angular velocity about the Z-axis is detected based on the deflection. However, the angular velocity may be erroneously detected in the case where the weight is subjected to an inertial force caused by external impacts or vibrations, thereby resulting in a deflection of the coupling portion in the Y-axis direction. To prevent such erroneous detection of angular velocity, it is necessary to provide the inertial force sensor with a vibration-isolation structure against external impacts and vibrations. In this case, the vibration-isolation structure is designed to decrease vibrations in the Y-axis direction, which requires that a supporting member for supporting the detector element be easy to deflect in the Y-axis direction. However, such a vibration-isolation structure of conventional inertial force sensors can hardly prevent vibrations not only in the Y-axis direction but also in plural axis directions, such as the X-axis and Z-axis directions.

CITATION LIST

Patent Literature

Patent Literature 1: Japanese Patent Laid-Open Publication No. 2008-046058A
Patent Literature 2: WO2006/132277

SUMMARY OF THE INVENTION

An inertial force sensor includes a detector element, a supporting body supporting the detector element, and a case holding the detector element via the first supporting body. The supporting body has flexibility and has a plate shape. The detector element includes a weight, a flexible coupling portion extending along a plane and supporting the weight, a fixing portion holding the weight via the coupling portion, and a detector detecting angular velocities about at least two axes non-parallel to each other. The supporting body extends in parallel with the plane from the detector element, and bends at a bending portion in a direction away from the plane.

This inertial force sensor can detect the angular velocities while preventing erroneous detection caused by external impacts and vibrations.

DETAILED DESCRIPTION OF PREFERRED EMBODIMENT

Figure 1:
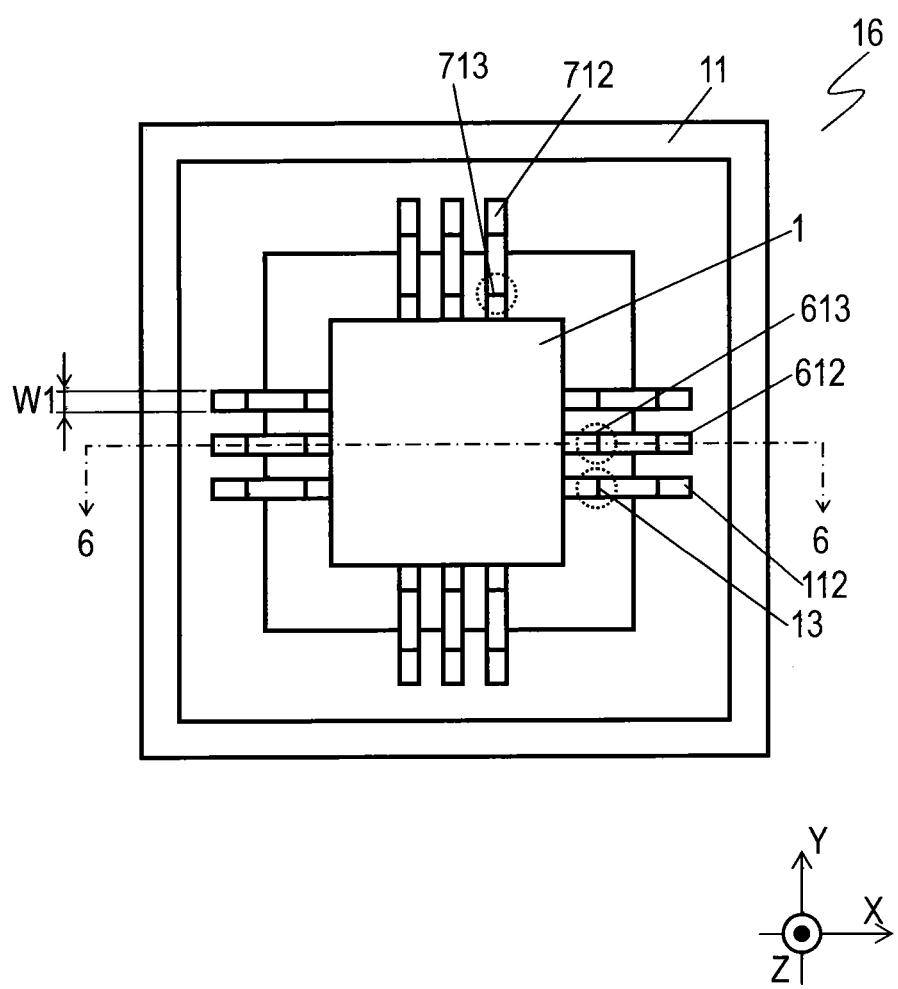
FIG. 1 is a plan view of an inertial force sensor according to an exemplary embodiment of the present invention.

FIG. 1 is a plan view of inertial force sensor 16 according to an exemplary embodiment of the present invention. Inertial force sensor 16 includes detector element 1 that detects acceleration, angular velocity, or both of them applied thereto. Case 11 made of ceramic or metal accommodates detector element 1. Although case 11 opens at an upper portion thereof, inertial force sensor 16 may include a lid that seals the upper portion of case 11, if necessary. Plural supporting bodies 112 support detector element 1 in case 11.

Figure 2:
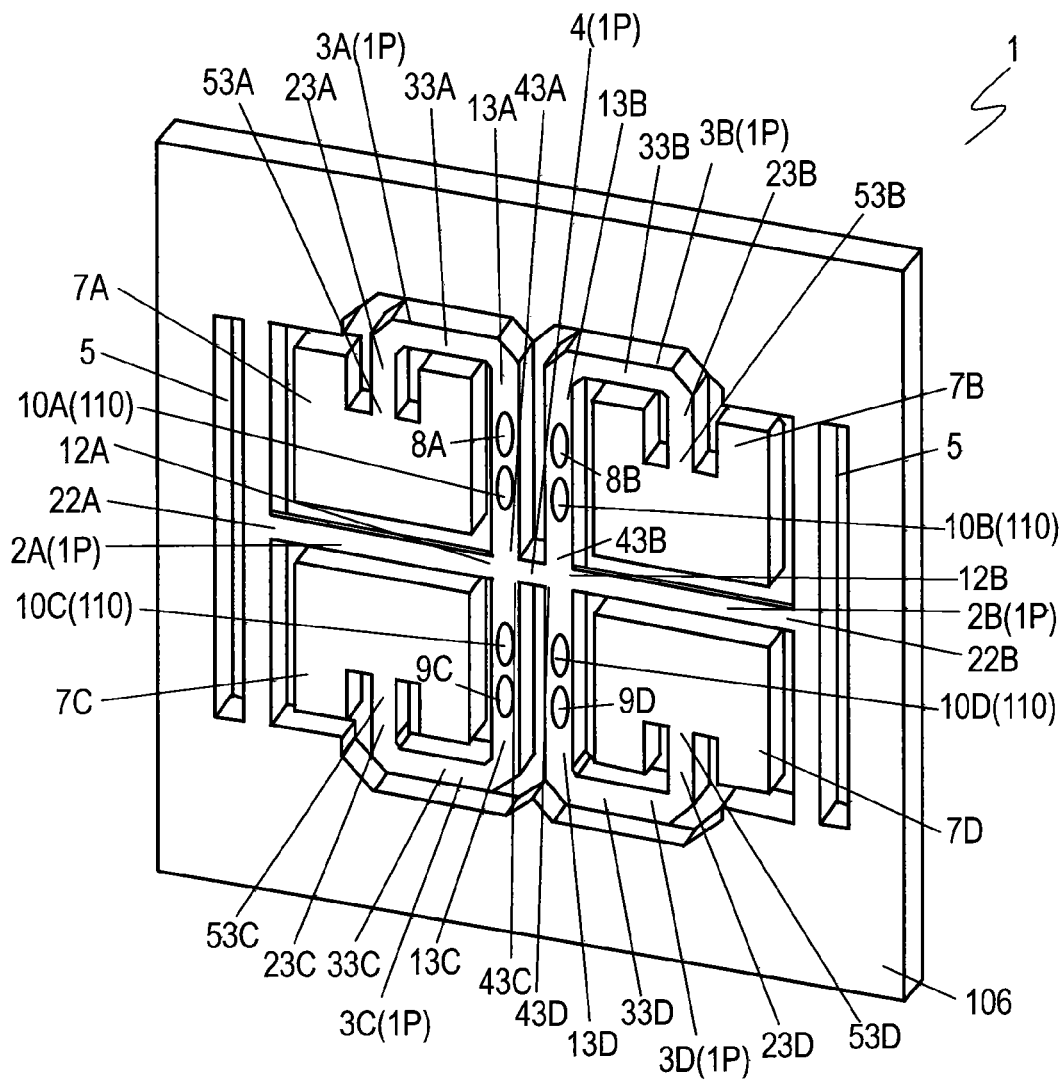
FIG. 2 is a perspective view of a detector element of the inertial force sensor according to the embodiment.

FIG. 2 is a perspective view of detector element 1. Detector element 1 includes, holding portion 4, six arms 2A, 2B, and 3A to 3D extending from holding portion 4, weights 7A to 7D connected with arms 3A to 3D, respectively, and fixing portion 106 coupled with arms 2A and 2B. Fixing portion 106 has a frame shape that surrounds holding portion 4, arms 2A, 2B, and 3A to 3D, and weights 7A to 7D. Arms 2A, 2B, and 3A to 3D have flexibility, and constitute coupling portion 1P. Thus, weights 7A to 7D are coupled with fixing portion 106 via coupling portion 1P having flexibility. Slits 5 are disposed in fixing portion 106.

Arms 3A to 3D have U-shapes extend perpendicularly from arms 2A and 2B, extend perpendicularly in parallel with arms 2A and 2B, and further extend perpendicularly in parallel with portions of arms 3A to 3D connected with arm 2A or 2B. Distal ends of arms 3A to 3D are connected with weights 7A to 7D, respectively. Arms 2A and 2B are arranged symmetrically to one another with respect to holding portion 4. Arms 3A to 3D are symmetrically arranged with respect to holding portion 4.

A configuration of detector element 1 will be described in detail. Three axes perpendicular to each other: an X-axis; a Y-axis; and a Z-axis are defined. Positive direction 1A and negative direction 1B opposite to each other along the X-axis are defined. Positive direction 1C and negative direction 1D opposite to each other along the Y-axis are defined. Positive direction 1E and negative direction 1F opposite to each other along the Z-axis are defined. Arm 2A extends in direction 1B from holding portion 4, in parallel with the X-axis. Arm 2B extends in direction 1A opposed to direction 1B, in parallel with the X-axis. Arm 2A has end 22A connected with fixing portion 106 and has end 12A connected with holding portion 4. Arm 2B has end 22B connected with fixing portion 106 and has end 12B connected with holding portion 4.

Arm 3A is has a substantial U-shape including extension bar portions 13A and 23A that extend in parallel with the Y-axis, separated end 43A that is one end of extension bar portion 13A, separated end 53A that is one end of extension bar portion 23A, and closed end 33A connecting respective other ends of extension bar portions 13A and 23A with each other. Separated ends 43A and 53A are separated from each other. Separated end 43A is connected with holding portion 4. Separated end 53A is connected with weight 7A. Separated ends 43A and 53A are located in direction 1D parallel to the Y-axis from closed end 33A. Extension bar portion 23A having separated end 53A is located in direction 1B from extension bar portion 13A having separated end 43A.

Arm 3B has a substantial U-shape including extension bar portions 13B and 23B that extend in parallel with the Y-axis, separated end 43B that is one end of extension bar portion 13B, separated end 53B that is one end of extension bar portion 23B, and closed end 33B connecting respective other ends of extension bar portions 13B and 23B with each other. Separated ends 43B and 53B are separated from each other. Separated end 43B is connected with holding portion 4. Separated end 53B is connected with weight 7B. Separated ends 43B and 53B are located in direction 1D from closed end 33B. Extension bar portion 23B having separated end 53B is located in direction 1A connected extension bar portion 13B having separated end 43B.

Arm 3C has a substantial U-shape including extension bar portions 13C and 23C that extend in parallel with the Y-axis, separated end 43C that is one end of extension bar portion 13C, separated end 53C that is one end of extension bar portion 23C, and closed end 33C connecting respective other ends of extension bar portions 13C and 23C. Separated ends 43C and 53C are separated from each other. Separated end 43C is connected with holding portion 4. Separated end 53C is connected with weight 7C. Separated ends 43C and 53C are located in direction 1C opposite to direction 1D parallel to the Y-axis from closed end 33C. Extension bar portion 23C having separated end 53C is located in direction 1B from extension bar portion 13C having separated end 43C.

Arm 3D has a substantial U-shape including extension bar portions 13D and 23D that extend in parallel with the Y-axis, separated end 43D that is one end of extension bar portion 13D, separated end 53D that is one end of extension bar portion 23D, and closed end 33D connecting respective other ends of extension bar portions 13D and 23D with each other. Separated ends 43D and 53D are separated from each other. Separated end 43D is connected with holding portion 4. Separated end 53D is connected with weight 7D. Separated ends 43D and 53D are located in direction 1C from closed end 33D. Extension bar portion 23D having separated end 53D is located in direction 1A from extension bar portion 13D having separated end 43D.

Thus, coupling portion 1P including arms 2A, 2B, and 3A to 3D having flexibility extends along a plane in parallel with an XY-plane including the X-axis and the Y-axis, and supports weights 7A to 7D. Fixing portion 106 holds weights 7A to 7D via coupling portion 1P. Supporting body 112 having a plate shape with flexibility supports detector element 1. Case 11 holds detector element 1 via supporting body 112. Supporting body 112 extends in parallel with the XY-plane from detector element 1, and then bends at bending portion 13 in a direction away from a plane in which coupling portion 1P extends.

Driving electrodes 8A and 8B to drive weights 7A and 7B to vibrate are disposed on extension bar portions 13A and 13B of arms 3A and 3B connected with holding portion 4, respectively. Driving electrodes 9C and 9D to drive weights 7C and 7D to vibrate are disposed on extension bar portions 13C and 13D of arms 3C and 3D connected with holding portion 4, respectively. Sensing electrodes 10A to 10D to sense strains of arms 3A to 3D are disposed on extension bar portions 13A to 13D of arms 3A to 3D, respectively. Each of driving electrodes 8A, 8B, 9C, and 9D and sensing electrodes 10A to 10D is formed by laminating a lower electrode, a piezoelectric body, and an upper electrode on respective one of arms 3A to 3D. The piezoelectric layer is composed of piezoelectric material, such as lead zirconate titanate (PZT). Arms 2A and 2B and 3A to 3D are disposed in a plane parallel to the XY-plane including the X-axis and the Y-axis.

An operation of detector element 1 for detecting angular velocities will be described below.

Figure 3:
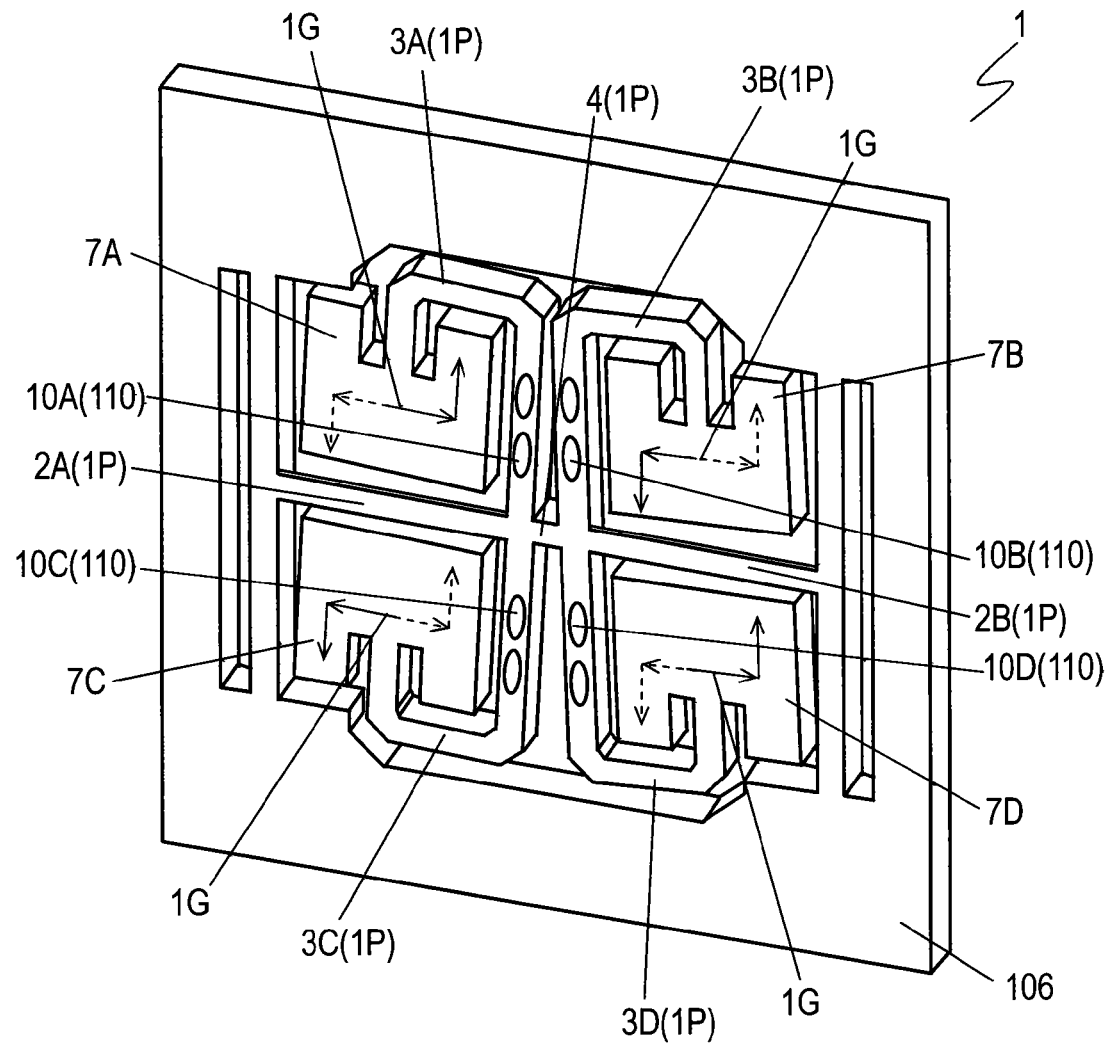
FIG. 3 is a perspective view of the detector element according to the embodiment for illustrating an operation of the detector element.
Figure 3:
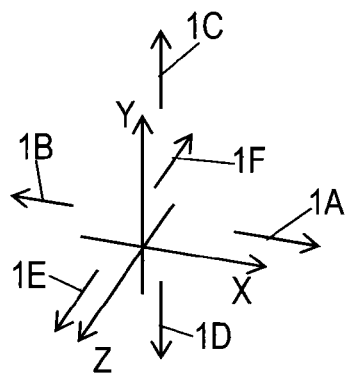

FIG. 3 is a perspective view of detector element 1 detecting an angular velocity. Weights 7A to 7D are coupled with fixing portion 106 via arms 2A, 2B, and 3A to 3D having flexibility, and vibrate at a predetermined resonance frequency of the vibration. Alternating-current (AC) voltages having the resonance frequency are applied to driving electrodes 8A, 8B, 9C, and 9D so as to vibrate arms 3A to 3D to vibrate, thereby causing weight 7A to synchronously vibrate in directions 1A and 1B parallel to the X-axis (driving vibration 1G).

According to the embodiment, the AC voltages applied to driving electrodes 8A and 8B has the same phase. The AC voltages applied to driving electrodes 9C and 9D are identical to each other, and have a phase inverse to that of the AC voltages applied to driving electrodes 8A and 8B. These voltages causes driving vibration 1G to displace weights 7A and 7B in directions opposite to each other, to displace weights 7C and 7D in directions opposite to each other, to displace weights 7A and 7C in directions opposite to each other, and to displace weights 7B and 7D in directions opposite to each other. That is, when a distance between weights 7A and 7B decreases, a distance between weights 7C and 7D increases.

Figure 4:
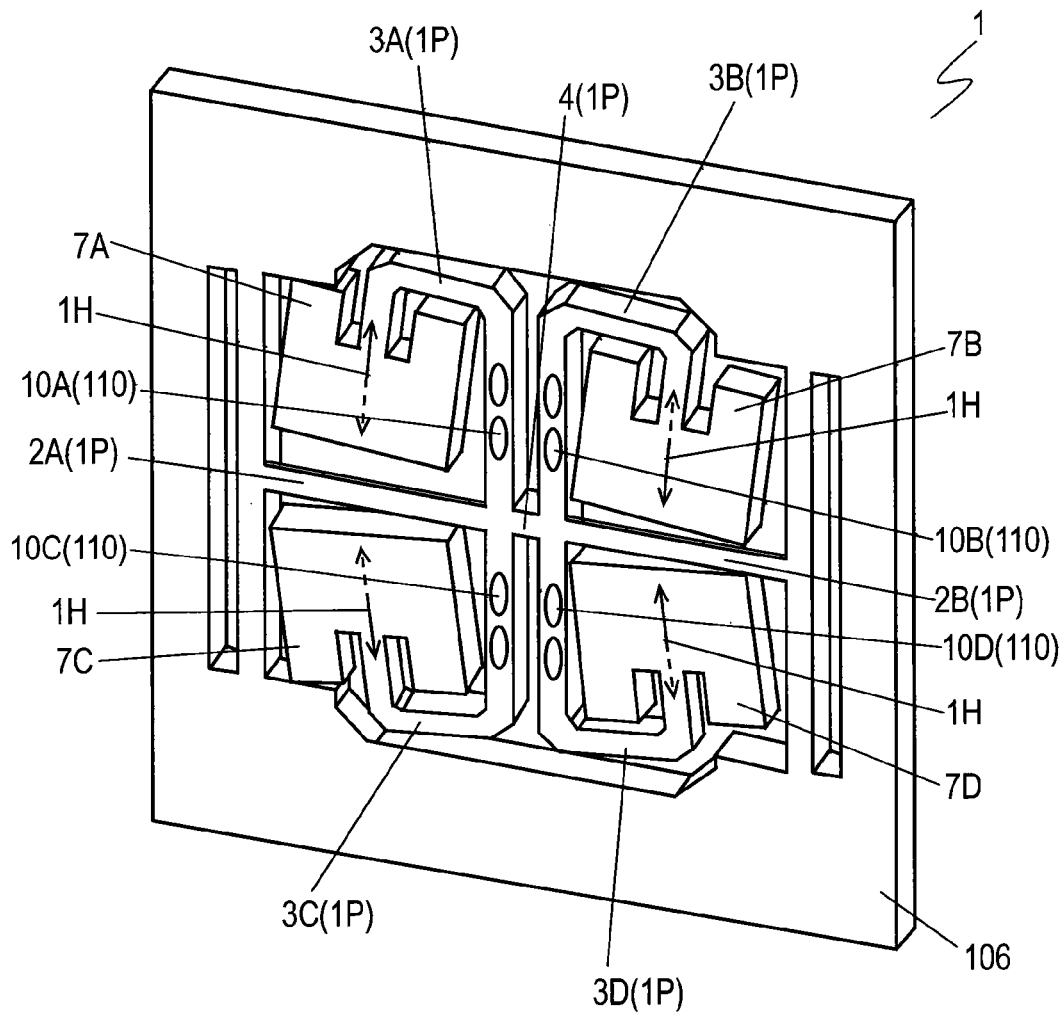
FIG. 4 is a perspective view of the detector element according to the embodiment for illustrating the operation of the detector element having an angular velocity about a Z-axis.

FIG. 4 is a perspective view of detector element 1 having angular velocity A1 about the Z-axis while detector element 1 is vibrating as shown in FIG. 3. In FIG. 4, angular velocity A1 is in a direction of clockwise rotation of detector element 1 about the Z-axis, i.e., a direction of rotation from positive direction 1C of the Y-axis to positive direction 1A of the X-axis. In synchronization with driving vibration 1G of weights 7A to 7D shown in FIG. 3, Coriolis force 1H is produced on weight 7A in directions 1C and 1D of the Y-axis perpendicular to directions 1A and 1B of driving vibration 1G, as shown in FIG. 4. Coriolis force 1H applies strains onto arms 3A to 3D. Sensing electrodes 10A to 10D disposed respectively on arms 3A to 3D sense the strains applied onto arms 3A to 3D, and output signals accordingly. Based on polarities of these signals, the direction of Coriolis force 1H is detected. Sensing electrodes 10A to 10D can detect the direction of Coriolis force 1H by separately sensing strains on inner and outer peripheries of the U-shape of arms 3A to 3D. That is, Coriolis force 1H produces a difference between expansion rates at the inner and outer peripheries of the U-shape of each of arms 3A to 3D. The difference allows sensing electrodes 10A to 10D to detect the direction and magnitude of Coriolis force 1H. Sensing element 1 can detect the direction and magnitude of angular velocity A1, based on the sensed direction and magnitude of Coriolis force 1H.

Figure 5:
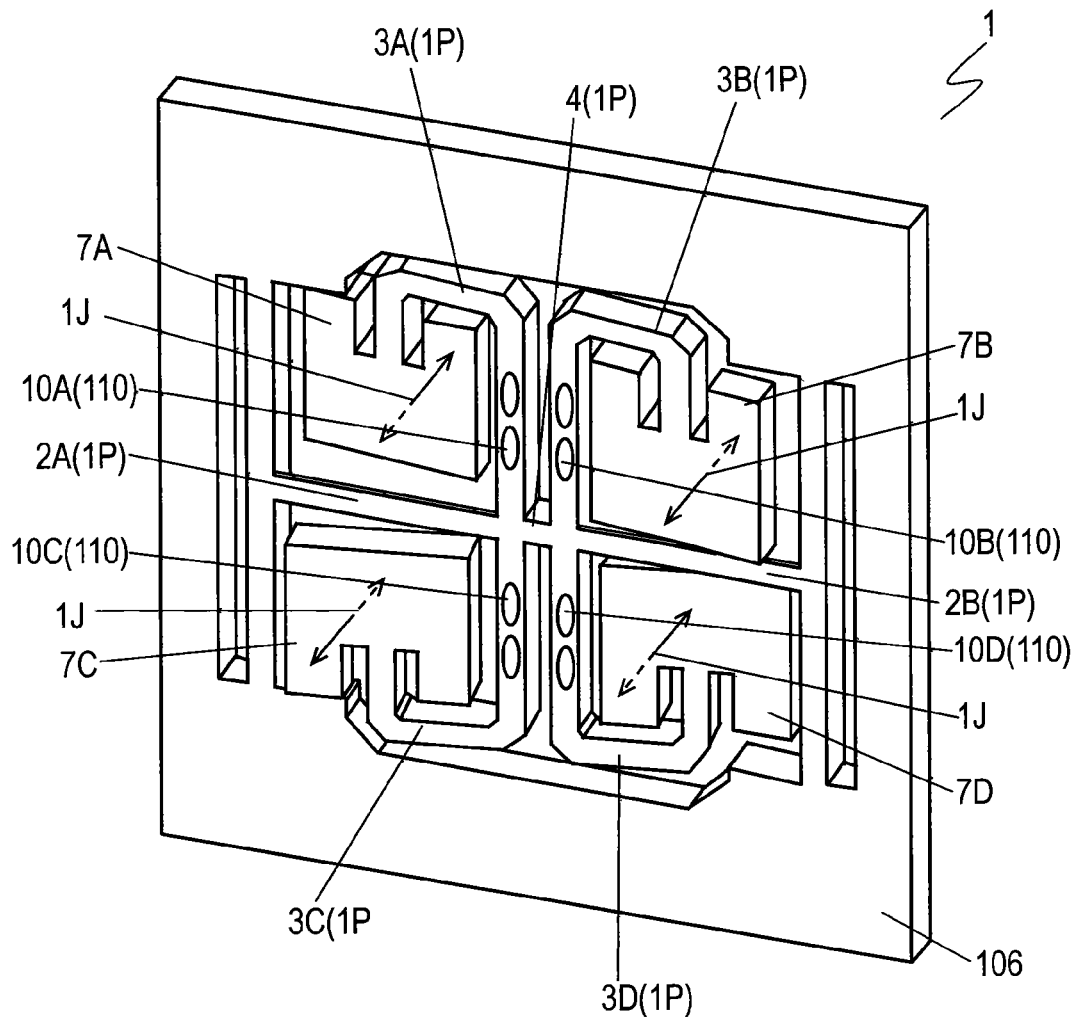
FIG. 5 is a perspective view of the detector element according to the embodiment for illustrating the operation of the detector element having an angular velocity about a Y-axis.
Figure 5:
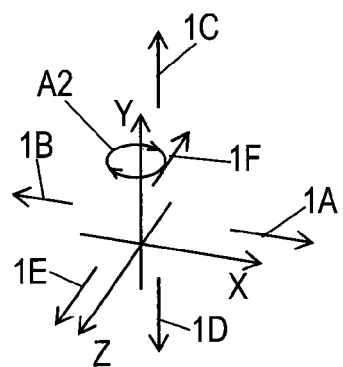

FIG. 5 is a perspective view of detector element 1 having angular velocity A2 about the Y-axis while detector element 1 vibrates as shown in FIG. 3. In FIG. 5, angular velocity A2 is in a direction of clockwise rotation of detector element 1 about the Y-axis, i.e., a direction of rotation from positive direction 1A of the X-axis to positive direction 1E of the Z-axis. In synchronization with driving vibration 1G of weights 7A to 7D shown in FIG. 3, Coriolis force 1J is produced on weight 7A in directions 1E and 1F of the Z-axis perpendicular to directions 1A and 1B of driving vibration 1G, as shown in FIG. 5. Coriolis force 1J applies strains onto arms 3A to 3D. Sensing electrodes 10A to 10D disposed respectively on arms 3A to 3D sense the strains applied onto arms 3A to 3D, and output signals accordingly. Based on polarities of these signals, the direction of Coriolis force 1J is detected. Sensing electrodes 10A to 10D can detect the direction of Coriolis force 1J by separately sensing strains on different portions of arms 3A to 3D, i.e., strains on portions toward positive direction 1E of the Z-axis and strains on portions in negative direction 1F of the Z-axis. That is, Coriolis force 1J produces a difference between expansion rates of the portions of arms 3A to 3D in direction 1E and the portions of arms 3A to 3D in direction 1F. This difference allows sensing electrodes 10A to 10D to detect the direction and magnitude of Coriolis force 1J. Sensing element 1 can detect the direction and magnitude of angular velocity A2 based on the sensed direction and magnitude of Coriolis force 1J.

Thus, sensing electrodes 10A to 10D constitute detector 110 that detects angular velocities A1 and A2. Detector 110 detects angular velocities A1 and A2 about at least two axes, i.e. the Y-axis and the Z-axis, respectively, which are non-parallel to each other.

As shown in FIGS. 2 to 5, detector element 1 capable of detecting angular velocities A1 and A2 about the Z-axis and the Y-axis, respectively, has substantially a plate shape that extends in parallel with the XY-plane, hence having a low profile.

In detector element 1, when weights 7A to 7D perform driving vibration 1G in parallel with the X-axis, Coriolis forces 1H and 1J due to angular velocities A1 and A2 produce strains on arms 3A to 3D. The strains appear as vibrations accompanying driving vibration 1G in the directions of the Y-axis and Z-axis. That is, arms 3A and 3D perform driving vibration 1G in the direction of the X-axis, and perform the vibrations in the directions of the Y-axis and Z-axis due to the angular velocities. Arms 3A to 3D connected with weights 7A to 7D have a resonance frequency of the vibration in the direction of the X-axis, a resonance frequency of the vibration in the direction of the Y-axis, and a resonance frequency of the vibration in the direction of the Z-axis. These arms vibrate at the respective resonance frequencies in the X-axis, Y-axis, and Z-axis due to driving vibration 1G and Coriolis forces 1H and 1J. Strains on arms 3A to 3D are detected with reference to frequencies of the vibrations in the direction of the X-axis of arms 3A to 3D. Therefore, in each of arms 3A to 3D, a difference between the resonance frequencies in the directions of the X-axis and Y-axis and a difference between the resonance frequencies in the directions of the X-axis and Y-axis are preferably small to raise sensitivity of detector element 1 in detecting angular velocity A1 and A2.

Detector element 1 of inertial force sensor 16 can detect acceleration. Arms 2A and 2B are thinner than arms 3A to 3D, accordingly causing arms 2A and 2B to be more flexible than arms 3A to 3D. Strains are applied on arms 2A and 2B due to acceleration applied to detector element 1. By sensing the strains, the acceleration can be detected. Acceleration in the direction of the Y-axis generates strains that cause arms 2A and 2B to deform in the direction of the Y-axis. By sensing the strains, the acceleration in the directions of the Y-axis can be detected. Also, acceleration in the direction of the Z-axis generates strains that cause arms 2A and 2B to deform in the direction of the Z-axis. By sensing the strains, the acceleration in the Z-axis direction can be detected. Thus, inertial force sensor 16 including detector element 1 can detect the acceleration as well as angular velocities.

In order to detect acceleration, detector element 1 may further include an opposed substrate facing weights 7A and 7B in the direction of the Z-axis, electrodes disposed on weights 7A to 7D, and opposed electrodes facing these electrodes. Arms 2A and 2B are thinner than arms 3A to 3D, hence causing arms 2A and 2B to be more flexible in the direction of the Z-axis than arms 3A to 3D. Acceleration changes the distances between electrodes disposed on weights 7A and 7B and corresponding opposed electrodes facing these electrodes, and changes capacitances between the electrodes accordingly. By sensing the change of the capacitances, detector element 1 can detect the acceleration. In detector element 1, since acceleration in the direction of the Y-axis changes capacitances between the electrodes and the opposed electrodes, the acceleration in the Y-axis direction can be detected by sensing the change of the capacitances. Also, since acceleration in the direction of the Z-axis changes capacitances between the electrodes and the opposed electrodes, the acceleration in the Y-axis direction can be detected by sensing the change of the capacitances. Thus, inertial force sensor 16 including detector element 1 can detect acceleration as well as angular velocities.

Figure 6:
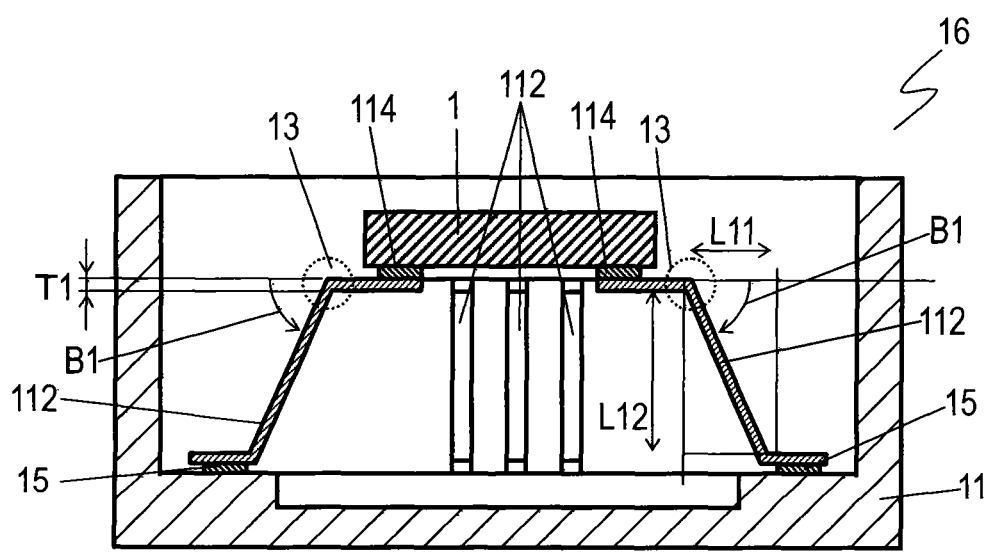
FIG. 6 is a cross-sectional view of the inertial force sensor taken along line 6-6 shown in FIG. 1.
Figure 6:
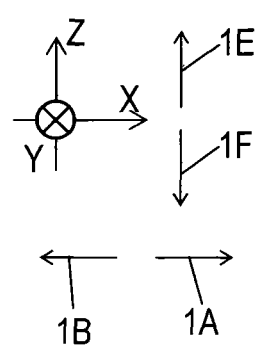

Inertial force sensor 16 including a vibration-isolation mechanism of detector element 1 will be described in detail below. FIG. 6 is a cross-sectional view of inertial force sensor 16 taken along line 6-6 shown in FIG. 1.

As shown in FIGS. 1 and 6, plural supporting bodies 112 are made of an elastic material having a plate shape, and support detector element 1 in case 11. Supporting bodies 112 may be made of conductive material, such as metal. In this case, supporting body 112 can connect electrically detector element 1 with case 11. Supporting body 112 has bending portion 13. Supporting body 112 bends at bending portion 13 from positive direction 1A of the X-axis to negative direction 1F of the Z-axis. A direction of the width of supporting body 112 at bending portion 13 is parallel with the XY-plane including the X-axis and the Y-axis.

Adhesion layer 114 made of adhesive fixes detector element 1 onto supporting body 112. Supporting body 112 has a surface facing positive direction 1E of the Z-axis and a surface facing negative direction 1F of the Z-axis. Detector element 1 is fixed on the surface of supporting body 112 facing positive direction 1E of the Z-axis. Adhesion layer 15 made of adhesive fixes supporting body 112 to case 11. Positive direction 1E of the Z-axis is directed upward. Detector element 1 is supported from underneath by supporting body 112.

A method of manufacturing inertia force sensor 16 will be described below. FIGS. 7 to 9, 11, and 13 are plan views of inertia force sensor 16 for illustrating the method of manufacturing inertia force sensor 16.

Lower electrodes, piezoelectric material thin films, and upper electrodes are formed on a silicon substrate by a thin-film technology, and then, are processed to have a predetermined shape by etching, thereby providing detector element 1 shown in FIG. 3.

Figure 7:
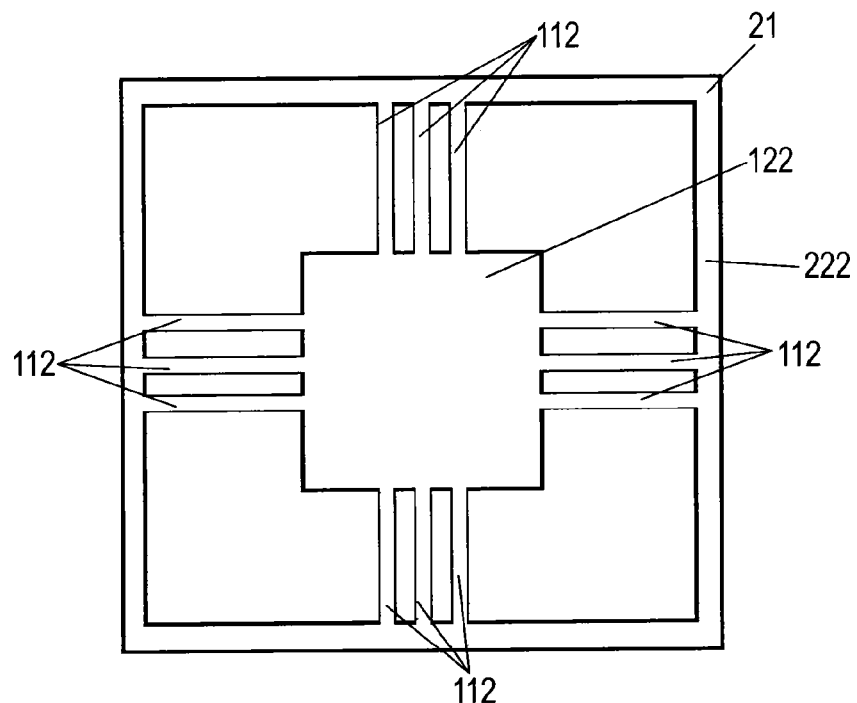
FIG. 7 is a plan view of the inertial force sensor according to the embodiment for illustrating a method of manufacturing the inertial force sensor.

As shown in FIG. 7, lead frame 21 made of a metal sheet of an elastic material having conductivity is prepared. Lead frame 21 is to be finally processed to be supporting bodies 112 shown in FIG. 6. Lead frame 21 includes center plate 122, plural supporting bodies 112 extending radially from center plate 122, and outer frame 222 connected with the supporting bodies 112. Outer frame 222 surrounds center plate 122 and supporting bodies 112.

Figure 8:
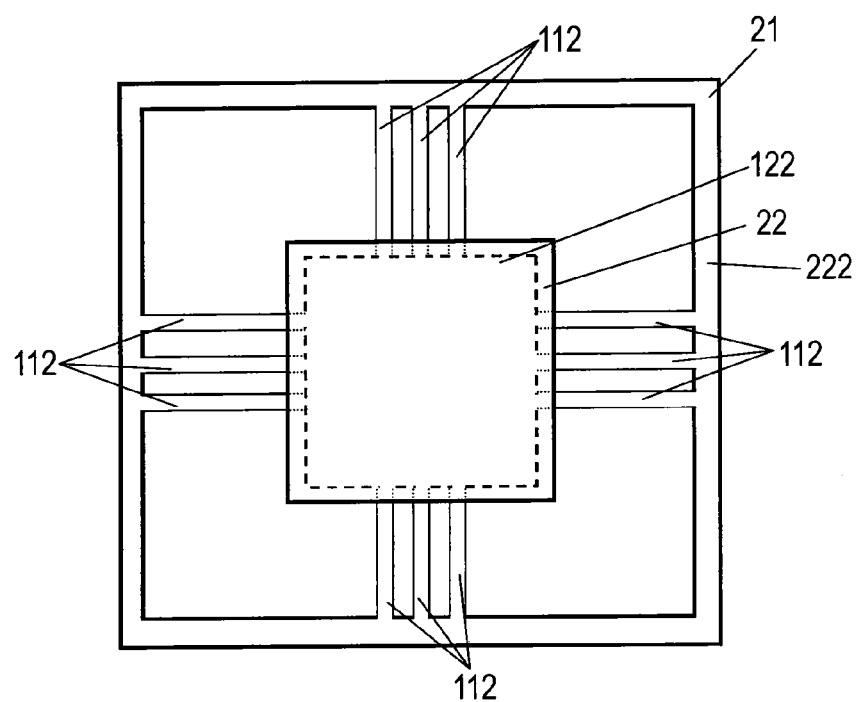
FIG. 8 is a plan view of the inertial force sensor according to the embodiment for illustrating the method of manufacturing the inertial force sensor.

As shown in FIG. 8, adhesive film 22 is attached to center plate 122 to cover center plate 122. Adhesive film 22 covers portions at which supporting bodies 112 are coupled with center plate 122, as well as center plate 122.

Figure 9:
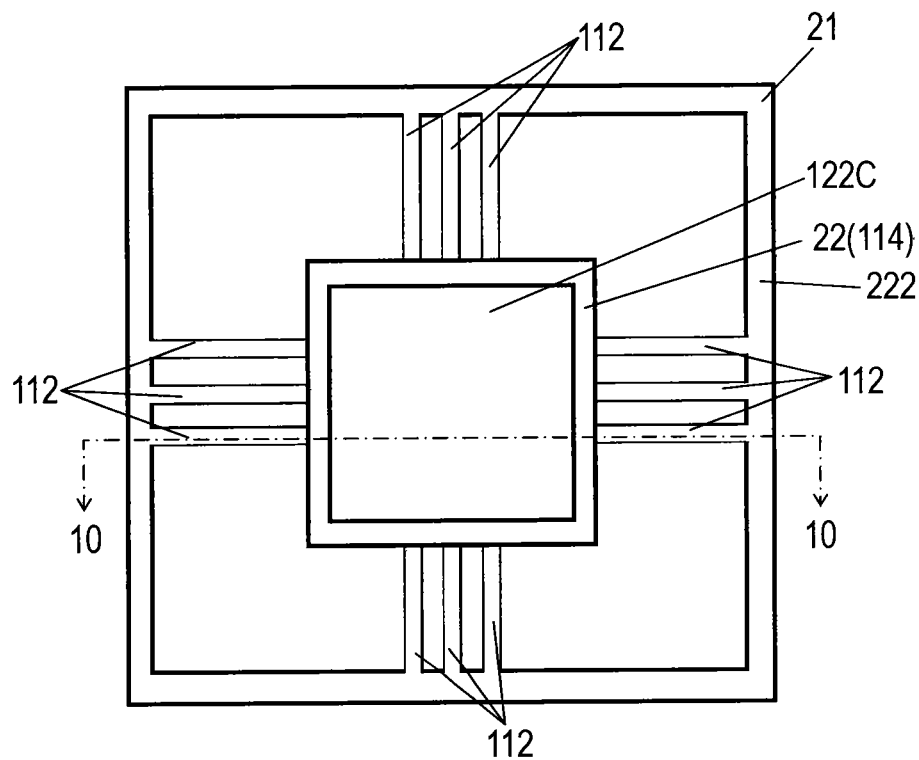
FIG. 9 is a plan view of the inertial force sensor according to the embodiment for illustrating the method of manufacturing the inertial force sensor.
Figure 10:
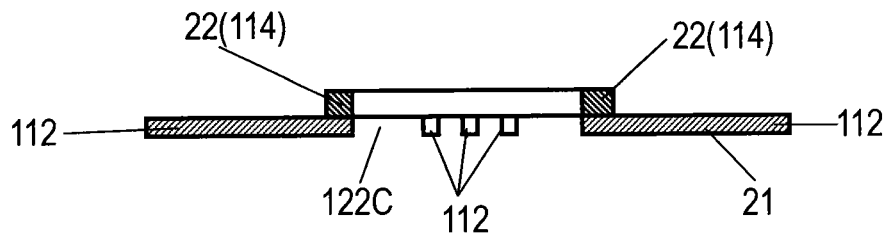
FIG. 10 is a cross-sectional view of the inertial force sensor taken along line 10-10 shown in FIG. 9.

As shown in FIG. 9, through-hole 122C is formed by punch-pressing center portions of lead frame 21 and adhesive film 22. FIG. 10 is a cross-sectional view of lead frame 21 taken along line 10-10 shown in FIG. 9. Through-hole 122C is formed by punch-pressing lead frame 21 and adhesive film 22 such that center plate 22 of lead frame 21 is entirely removed from lead frame 21, while an outer periphery of adhesive film 22 is remained. The outer periphery of adhesive film 22 is to be adhesion layer 114.

Figure 11:
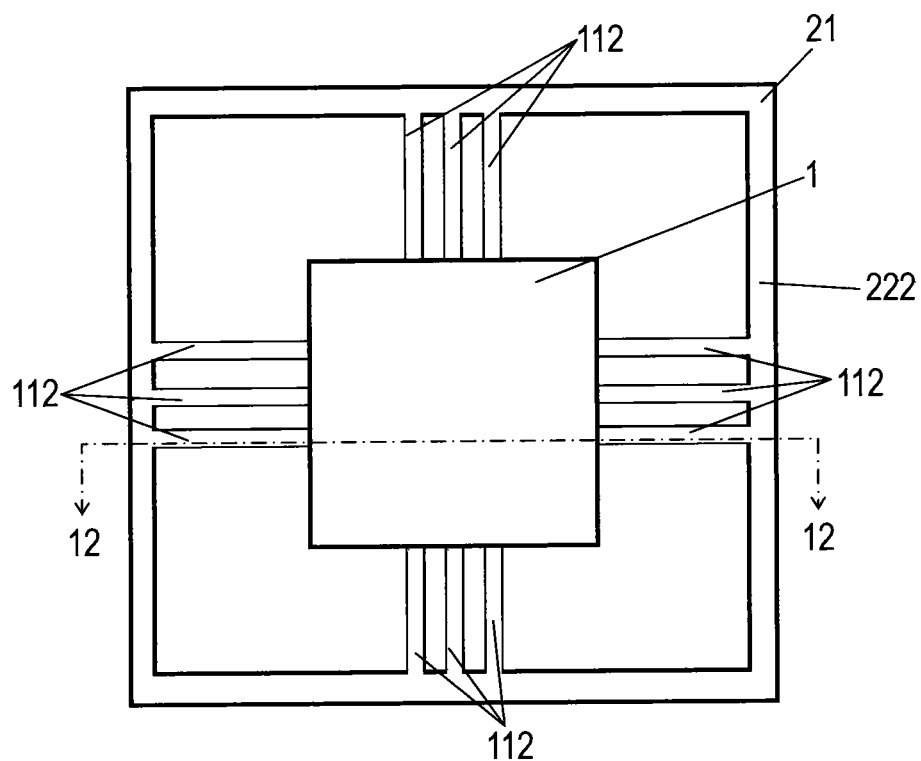
FIG. 11 is a plan view of the inertial force sensor according to the embodiment for illustrating the method of manufacturing the inertial force sensor.
Figure 12:
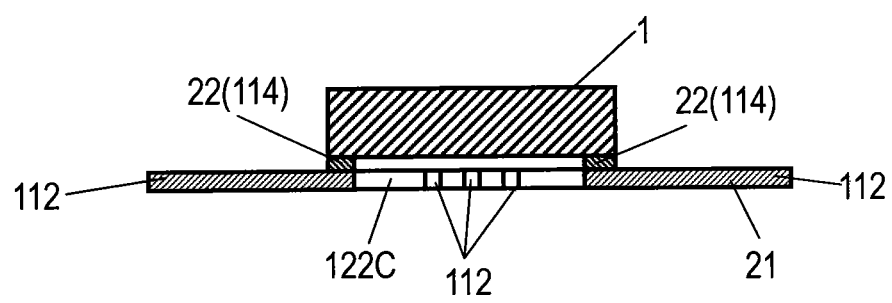
FIG. 12 is a cross-sectional view of the inertial force sensor taken along line 12-12 shown in FIG. 11.

Next, as shown in FIG. 11, detector element 1 is disposed on adhesion film 22. FIG. 12 is a cross-sectional view of supporting bodies 112 and detector element 1 taken along line 12-12 shown in FIG. 11. Adhesion film 22 is to be adhesion layer 114 which causes detector element 1 to adhere to supporting bodies 112 of lead frame 21.

Figure 13:
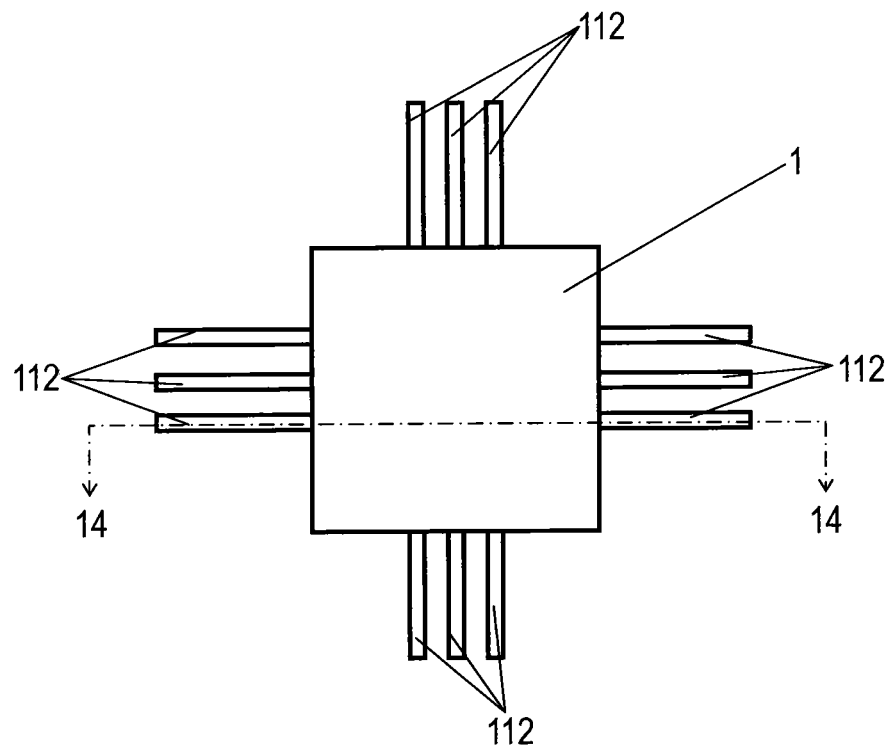
FIG. 13 is a plan view of the inertial force sensor according to the embodiment for illustrating the method of manufacturing the inertial force sensor.
Figure 14:
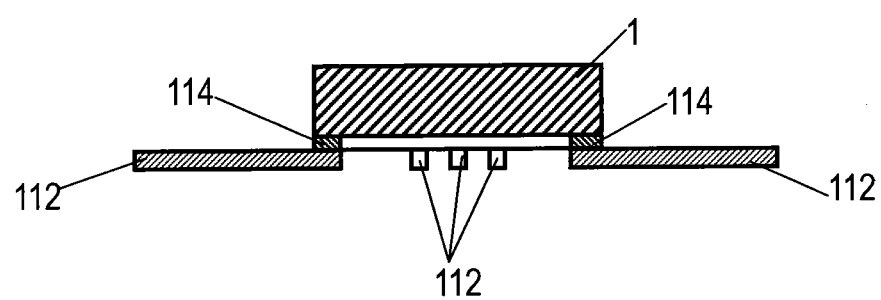
FIG. 14 is a cross-sectional view of the inertial force sensor taken along line 14-14 shown in FIG. 13.

Then, as shown in FIG. 13, outer frame 222 of lead frame 21 is removed by pressing. FIG. 14 is a cross-sectional view of supporting bodies 112 and detector element 1 taken along line 14-14 shown in FIG. 13. As shown in FIGS. 13 and 14, plural supporting bodies 112 are joined to detector element 1 with adhesion layer 114.

Figure 15A:
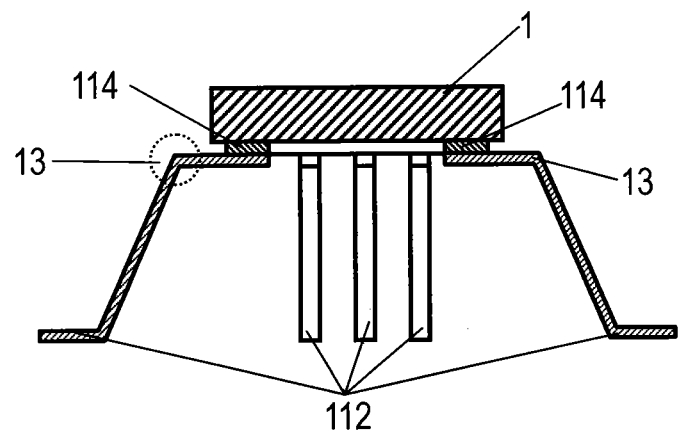
FIG. 15A is a cross-sectional view of the inertial force sensor according to the embodiment for illustrating the method of manufacturing the inertial force sensor.

Next, bending portions 13 are formed by bending supporting bodies 112 by processing, such as pressing. FIG. 15A is a cross-sectional view of detector element 1 and supporting bodies 112 having bending portions 13. After that, as shown in FIG. 6, supporting bodies 112 are joined to case 11 with adhesion layer 15, so that supporting bodies 112 and detector element 1 are disposed in case 111, thus providing inertial force sensor 16.

A vibration-isolation mechanism of inertia force sensor 16 will be described below.

Weights 7A and 7B vibrate due to driving vibration 1G in order to detect angular velocities A1 and A2, as shown in FIG. 3. The frequency of driving vibration 1G is often set to several tens kilohertz, such as 20 kHz or 40 kHz. If a natural frequency of inertial force sensor 16 is designed to be identical to the frequency of driving vibration 1G, inertial force sensor 16 vibrates with a large amplitude due to a resonance, and therefore, it is necessary to avoid causing the natural frequency to be identical to the frequency of driving vibration 1G. The natural frequency which is lower than the frequency of the vibration is more effective for vibration-isolation than the natural frequency which is higher than the frequency of the vibration. An object having a mass supported by an elastic body having spring constant k, provides natural frequency f expressed as the following equation.

$$f = 1/2\pi (k/m)^{1/2}$$

As shown in this equation, the smaller the spring constant k is, the lower the natural frequency f.

As shown in FIGS. 1 and 6, supporting bodies 112 having a plate shape extend in a strip shape with width W1 and thickness T1 in a direction perpendicular to the width W1. The thickness T1 is smaller than the width W1. In inertial force sensor 16, each of supporting bodies 112 having a plate shape made of elastic material has a small spring constant by bending supporting body 112 at bending portion 13 in the direction of thickness T1. This structure lowers the natural frequency, accordingly increasing effect of vibration-isolation. Since supporting bodies 112 and detector element 1 are held in case 11, supporting bodies 112 are prevented from deforming due to an external force applied during handling of inertial force sensor 16, hence having a constant spring constant. Moreover, even when inertial force sensor 16 is mounted to an object, supporting bodies 112 do not adhere directly to materials, such as solder, hence preventing the spring constants of supporting bodies 112 from changing due to such adhered materials. This configuration stably reduces transmission of external impacts and vibrations.

The direction of width W1 of each of supporting bodies 112 at bending portion 13 is parallel with the XY-plane and the plane in which arms 2A, 2B, and 3A to 3D are arranged. In FIG. 1, supporting body 612 out of plural supporting bodies 112 extending in the direction of X-axis has a width at bending portion 613 in a direction parallel with the Y-axis. Supporting body 712 out of plural supporting bodies 112 extending in the direction of the Y-axis has a width at bending portion 713 in a direction parallel with the X-axis. That is, the directions of widths of supporting bodies 112 at bending portions 13 are parallel with the XY-plane and the plane in which arms 2A, 2B, and 3A to 3D parallel to the XY-plane are arranged. The directions of the thicknesses of supporting bodies 112 at bending portions 13 are parallel with the Z-axis perpendicular to the directions of the widths, i.e., to the XY-plane.

Since arms 2A, 2B, and 3A to 3D are arranged in a plane parallel with the XY-plane, these arms can easily deflect in the direction of the Z-axis perpendicular to the plane. Therefore, upon an external force being applied to, arms 2A, 2B, and 3A to 3D tend to deflect in the direction of the Z-axis. When the arms deflect excessively, weights 7A to 7D may hit surrounding components, providing detector element 1 with damage. The directions of the widths of supporting bodies 112 at bending portions 13 are parallel with the XY-plane, and the directions of the thicknesses smaller than the widths are parallel with the Z-axis. Therefore, supporting bodies 112 easily deflect in the direction of the Z-axis perpendicular to the XY-plane, and easily absorb external forces in the direction of Z-axis. Thus, although detector element 1 is weak against external forces in the direction of the Z-axis, supporting bodies 112 can absorb the external forces in the direction of the Z-axis, hence reducing external forces in the direction of the Z-axis that act on detector element 1.

As shown in FIG. 6, bending angle B1 of supporting bodies 112 at bending portion 13 is an acute angle relative to the XY-plane in which arms 2A, 2B, and 3A to 3D are arranged. A portion of each of supporting bodies 112 extending from detector element 1 to case 11 has length L12 thereof in the direction of the Z-axis. Length L12 is larger than length L11 of the portion when projected onto the XY-plane. This configuration allows supporting bodies 112 to effectively absorb external forces particularly in a direction parallel with the XY-plane more than with other directions, thus reducing external forces acting on detector element 1 in a direction parallel with the XY-plane.

Figure 15B:
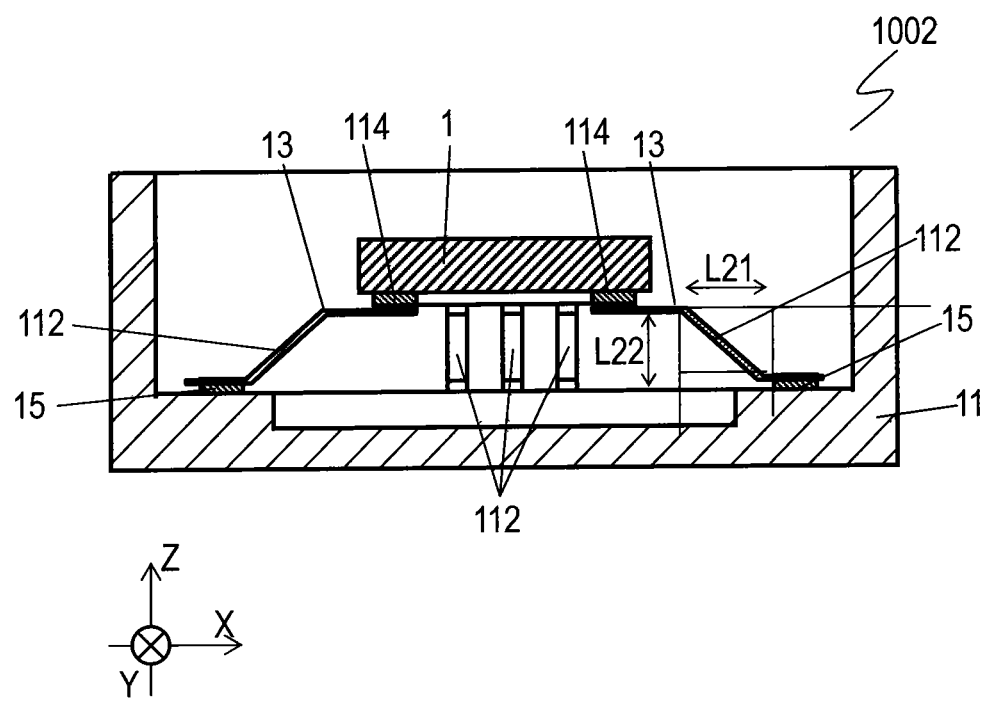
FIG. 15B is a cross-sectional of another inertial force sensor according to the embodiment for illustrating a method of manufacturing the inertial force sensor.

FIG. 15B is a cross-sectional view of another inertial force sensor 1002 according to the embodiment. In FIG. 15B, components identical to those of inertial force sensor 16 shown in FIG. 6 are denoted by the same reference numerals. In inertial force sensor 1002, a portion of each of supporting bodies 112 extending from detector element 1 to case 11 has length L21 when projected onto the XY-plane. Length L21 is larger than length L22 of the portion in the direction of the Z-axis. This configuration allows supporting bodies 112 to effectively absorb external forces particularly in the direction of the Z-axis more than in other directions, hence reducing external forces acting on detector element 1 in directions parallel with the XY-plane.

As shown in FIG. 1, plural supporting bodies 112 extend in parallel with the XY-plane from detector element 1, and include supporting body 612 extending in the direction of the X-axis from detector element 1 and supporting body 712 extending in the direction of the Y-axis non-parallel with the X-axis from detector element 1. Since a direction of the width of supporting body 612 extending in the direction of X-axis is parallel with the Y-axis at bending portion 613, the supporting body easily deflects in the direction of the X-axis as well as in the direction of the Z-axis. Since a direction of the width of supporting body 712 extending in the direction of Y-axis direction is parallel with the X-axis at bending portion 713, the supporting body easily deflects in the direction of the Y-axis direction as well as in the direction of the Z-axis. Thus, since detector element 1 is displaced in both the directions of the X-axis and Y-axis with identical degree, supporting bodies 112 can absorb vibrations in both the directions of the X-axis and Y-axis with similar characteristics. This provides detector element 1 with vibration-isolation effects against vibrations in both the directions of the X-axis and Y-axis in well-balanced manner.

Figure 16:
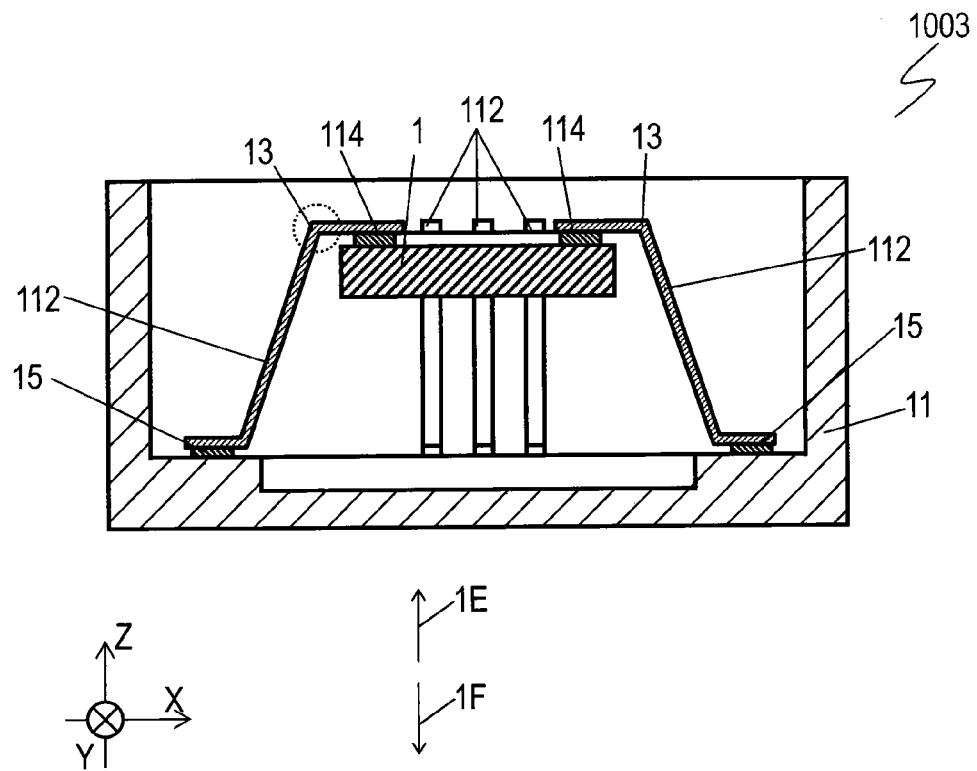
FIG. 16 is a cross-sectional view of still another inertial force sensor according to the embodiment.

FIG. 16 is a cross-sectional view of still another inertial force sensor 1003 according to the embodiment. In FIG. 16, components identical to those of inertial force sensor 16 shown in FIG. 6 are denoted by the same reference numerals. In inertial force sensor 16 shown in FIG. 6, detector element 1 is fixed onto a surface of supporting bodies 112 facing positive direction 1E of the Z-axis with adhesion layer 114. In contrast, in inertial force sensor 1003 shown in FIG. 16, detector element 1 is fixed onto a surface of supporting bodies 112 facing negative direction 1F of the Z-axis with adhesion layer 114. Positive direction 1E of the Z-axis is directed upward, and detector element 1 is suspended with supporting bodies 112. The height of inertial force sensor 1003 in the direction of the Z-axis shown in FIG. 16 can be smaller than that of inertial force sensor 16 shown in FIG. 6.

Figure 17:
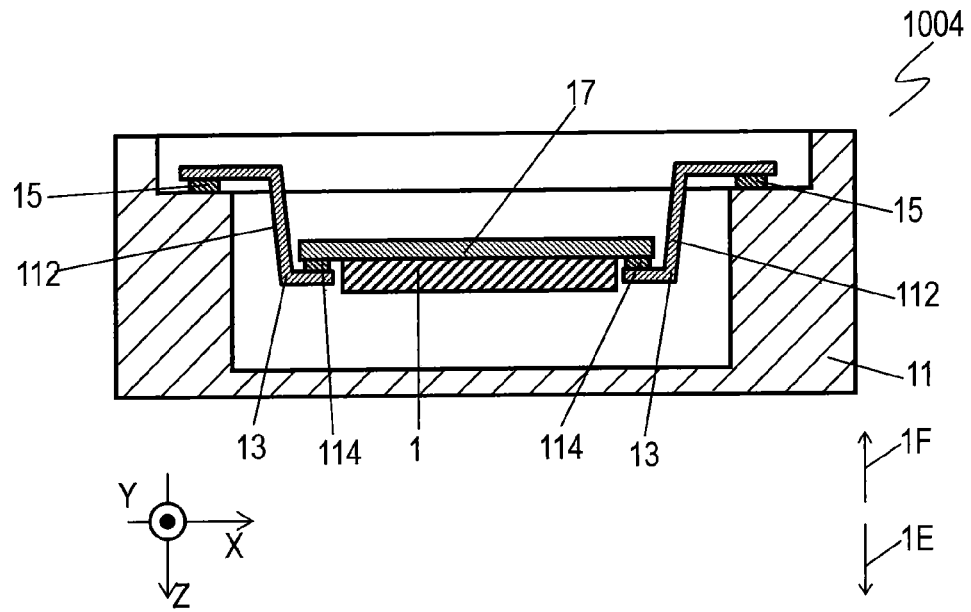
FIG. 17 is a cross-sectional view of a further inertial force sensor according to the embodiment.

FIG. 17 is a cross-sectional view of further inertial force sensor 1004 according to the embodiment. In FIG. 17, components identical to those of inertial force sensor 16 shown in FIG. 6 are denoted by the same reference numerals. Inertial force sensor 1004 shown in FIG. 17 further includes component 17 mounted onto detector element 1. Component 17 may be, for example, an integrated circuit (IC) that processes signals supplied from detector element 1. In inertial force sensor 1004, negative direction 1F of the Z-axis is directed upward. Supporting bodies 112 are suspended from case 11, and component 17 is disposed on a surface of supporting bodies 112 facing negative direction 1F of the Z-axis. Detector element 1 is mounted onto a surface of component 17 facing positive direction 1E of the Z-axis. Component 17 and detector element 1 are integrated unitarily, hence causing supporting bodies 112 to support a large mass. This configuration lowers the natural frequencies of vibrations of supporting bodies 112, detector element 1, and component 17, accordingly preventing resonances effectively.

Figure 18:
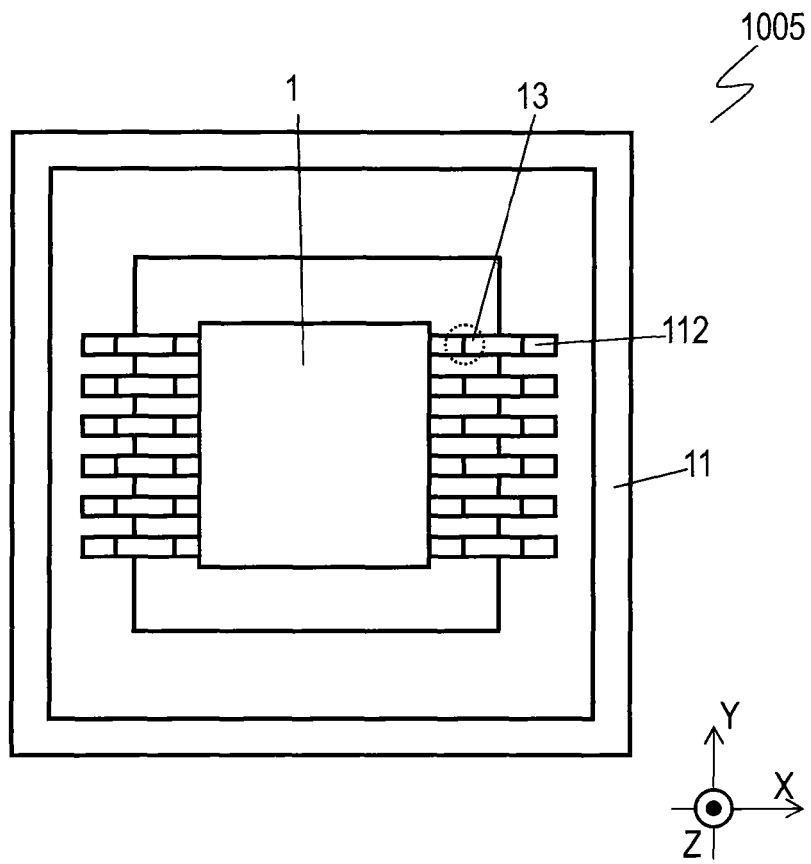
FIG. 18 is a plan view of a further inertial force sensor according to the embodiment.

FIG. 18 is a plan view of further inertial force sensor 1005 according to the embodiment. In FIG. 18, components identical to those of inertial force sensor 16 shown in FIGS. 1 to 4 are denoted by the same reference numerals. In inertial force sensor 16 shown in FIG. 1, plural supporting bodies 112 extend from detector element 1 in directions 1A and 1B of the X-axis and directions 1C and 1D of the Y-axis. Inertial force sensor 1005 shown in FIG. 18 includes plural supporting bodies 112 extending in directions 1A and 1B of the X-axis from detector element 1, but does not include any supporting body extending in directions of the Y-axis direction from detector element 1. This configuration reduces a width of inertial force sensor 1005 in the direction of the Y-axis, and reduces the size of lead frame 21 shown in FIG. 7 for manufacturing supporting bodies 112, thereby reducing cost of inertial force sensor 1005. In this case, the vibration-isolation effect against vibrations in the direction of the X-axis is superior to that against vibrations in the direction of Y-axis. In the case that detector element 1 does not detect Coriolis force 1H in the direction of Y-axis shown in FIG. 4, i.e., angular velocity A1 about the Z-axis, it is not necessary to suppress vibrations in the direction of the Y-axis, hence allowing inertial force sensor 1005 to accurately detect angular velocity A2 about the Y-axis shown in FIG. 5.

Figure 19:
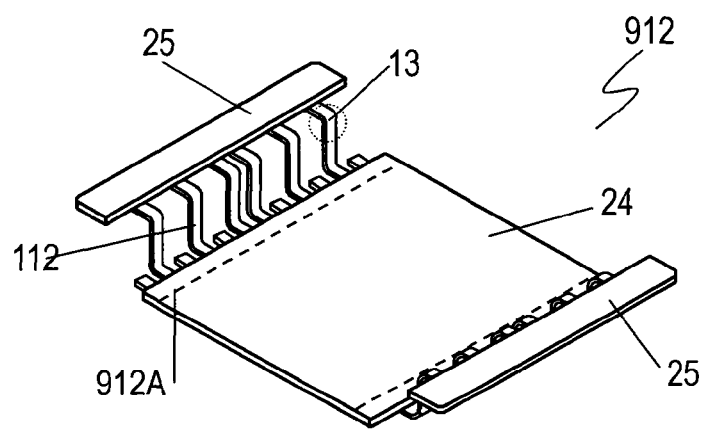
FIG. 19 is a perspective view of a lead frame of the inertial force sensor shown in FIG. 18.

FIG. 19 is a perspective view of lead frame 912 used in inertial force sensor 1006 shown in FIG. 18. Lead frame 912 includes center plate 912A and plural supporting bodies 112 extending from center plate 912A, and allows inertial force sensor 1005 to be manufactured by a Tape Automated Bonding (TAB) method. Center plate 912A of lead frame 912 is provided with loading portion 24 having electrical insulation properties. Detector element 1 is disposed on loading portion 24. Both of detector element 1 and component 17 shown in FIG. 17 may be mounted together onto loading portion 24, instead of sole detector element 1. Attaching portions 25 provided at tips of supporting bodies 112 of lead frame 912 are attached to case 11.

Figure 20:
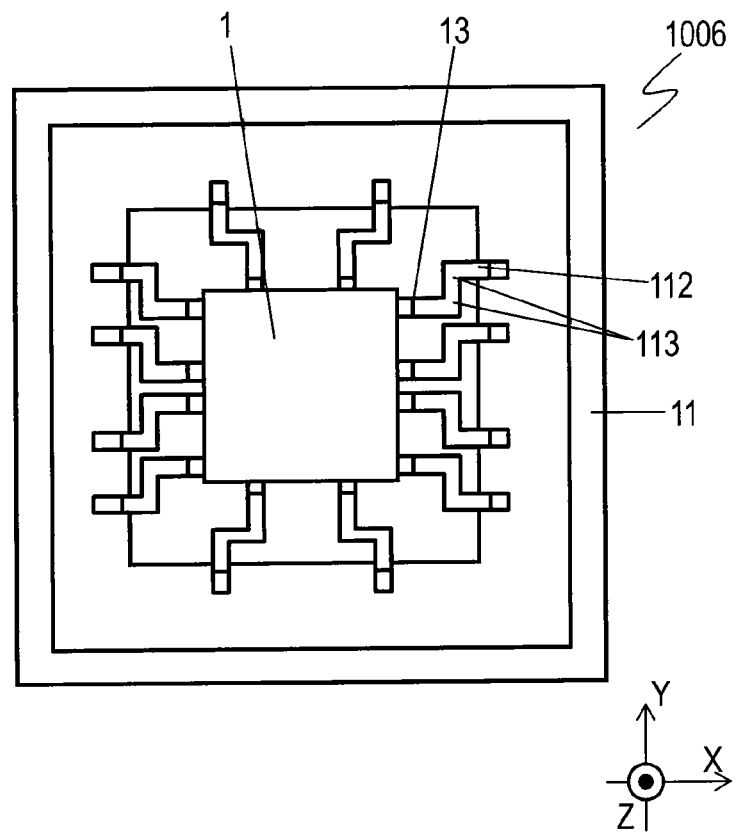
FIG. 20 is a plan view of a further inertial force sensor according to the embodiment.

FIG. 20 is a plan view of further inertial force sensor 1006 according to the embodiment. In FIG. 20, components identical to those of inertial force sensor 16 shown in FIGS. 1 to 4 are denoted by the same reference numerals. In inertial force sensor 1007 shown in FIG. 20, supporting bodies 112 bend not only at bending portions 13 in the direction of the Z-axis, i.e., the direction of the thickness of supporting body 112, but also at bending portions 113 in a direction parallel with the XY-plane parallel with the direction of the width of supporting bodies. This structure reduces spring constants to lower natural frequencies, accordingly preventing resonances more effectively.

Figure 21:
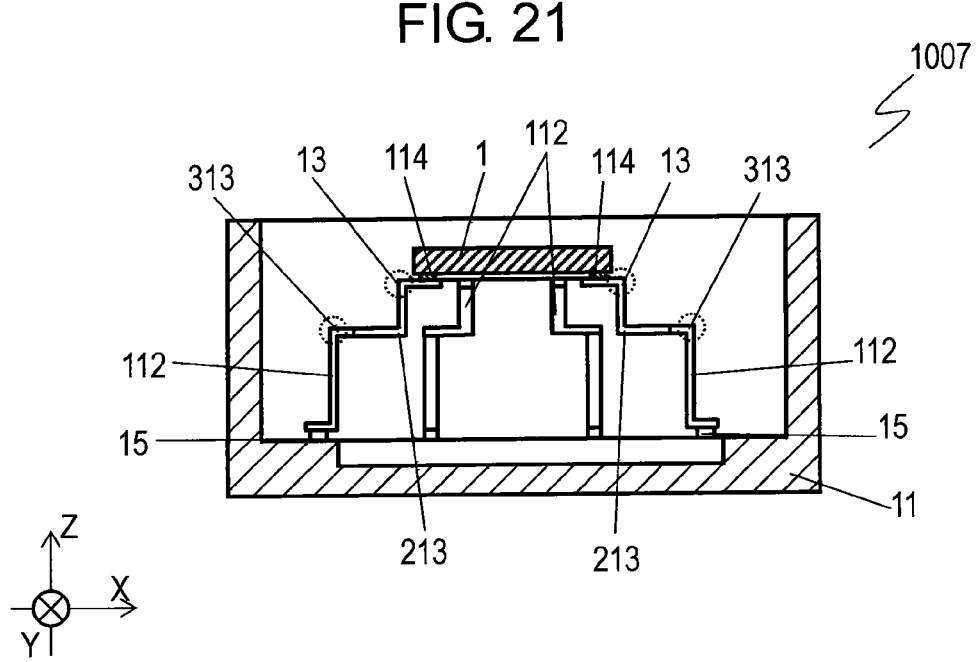
FIG. 21 is a cross-sectional view of the inertial force sensor taken along line 21-21 shown in FIG. 20.

FIG. 21 is a cross-sectional view of further inertial force sensor 1007 according to the embodiment. In FIG. 21, components identical to those of inertial force sensor 16 shown in FIG. 6 are denoted by the same reference numerals. In inertial force sensor 1008 shown in FIG. 21, supporting bodies 112 bend not only at bending portions 13 but also at bending portions 113 and 313 in the direction of the Z-axis, i.e., the direction of the thickness of supporting bodies. This structure reduces spring constants and reduces natural frequencies, accordingly preventing resonances more effectively.

Inertial force sensors according to the embodiment are not limited to the configurations described above. For example, detector element 1 may have a diaphragm construction. Detector element 1 may detect not only angular velocities about the Y-axis and the Z-axis, but also an angular velocity about the X-axis, the Y-axis, and the Z-axis. Furthermore, detector element 1 may detect acceleration in the directions of the X-axis, the Y-axis, and the Z-axis. Besides, detector element 1 may necessarily be designed not to detect acceleration.

INDUSTRIAL APPLICABILITY

An inertial force sensor according to the present invention can detect an angular velocity while preventing erroneous detection caused by external impacts or vibrations. This sensor is useful as an inertial force sensor detecting an angular velocity, and is useful for various electronic devices for attitude control or navigation of mobile objects such as aircrafts, automobiles, robots, boats and ships, and other vehicles.

DESCRIPTION OF REFERENCE MARKS

1 Detector Element
1P Coupling Portion
7A Weight
7B Weight
7C Weight
7D Weight
11 Case
13 Bending Portion (First Bending Portion, Second Bending Portion)
106 Fixing Portion
110 Detector
112 Supporting Body (First Supporting Body, Second Supporting Body)
612 Supporting Body (First Supporting Body)
712 Supporting Body (Second Supporting Body)
613 Bending Portion (First Bending Portion)
713 Bending Portion (Second Bending Portion)

The invention claimed is:

1. An inertial force sensor comprising:
   a detector element including
      a weight,
      a coupling portion extending along a plane and supporting the weight,
      a fixing portion holding the weight via the coupling portion, and
      a detector detecting angular velocities about at least two axes non-parallel to each other;
   a first supporting body supporting the detector element; and
   a case holding the detector element via the first supporting body,
   wherein the first supporting body extends in parallel with the plane from the detector element, and bends at a first bending portion in a direction away from the plane, and
   wherein a length of a portion of the first supporting body from the first bending point to the case when projected onto the plane is larger than a length of the portion of the first supporting body in a direction perpendicular to the plane.

2. The inertial force sensor according to claim 1,
   wherein the first supporting body has a width in a direction perpendicular to a direction in which the first supporting body extends from the detector element, and
   wherein the direction of the width of the first supporting body is parallel with the plane at the first bending portion.

3. The inertial force sensor according to claim 1, further comprising:
   a second supporting body supporting the detector element,
   wherein the second supporting body extends from the detector element in a direction that is in parallel with the plane and in non-parallel with the first supporting body, and bends at a second bending portion in a direction away from the plane.

4. An inertial force sensor comprising:
   a detector element including
      a weight,
      a coupling portion supporting the weight, the coupling portion extending along a plane substantially parallel to the detector element, a fixing portion holding the weight via the coupling portion, and a detector detecting angular velocities about at least two axes non-parallel to each other;

a supporting body supporting the detector element; and a case holding the detector element via the supporting body, wherein the supporting body includes a first portion extending in parallel with the plane from the detector element, a bending portion bending in a direction away from the plane and a second portion extending in a non-parallel direction with the plane, and wherein a length of the second portion of the supporting body when projected onto the plane is larger than a length of the second portion of the supporting body in a direction perpendicular to the plane.

5. The inertial force sensor according to claim 4, wherein the first supporting body has a plate shape.

6. An inertial force sensor comprising:

a detector element having an outer peripheral edge, the detector element including a weight, a coupling portion extending along a plane and supporting the weight, a fixing portion holding the weight via the coupling portion, and a detector detecting angular velocities about at least two axes non-parallel to each other;

a first supporting body supporting the detector element; and a case holding the detector element via the first supporting body, wherein the first supporting body extends in parallel with the plane from the outer peripheral edge of the detector element and away from the detector element, and bends at a first bending portion in a direction away from the plane.

7. The inertial force sensor according to claim 6, wherein the first supporting body has a width in a direction perpendicular to a direction in which the first supporting body extends from the detector element, and wherein the direction of the width of the first supporting body is parallel with the plane at the first bending portion.

8. The inertial force sensor according to claim 7, further comprising:

a second supporting body supporting the detector element, wherein the second supporting body extends from the detector element in a direction that is in parallel with the plane and in non-parallel with the first supporting body, and bends at a second bending portion in a direction away from the plane.

9. The inertial force sensor according to claim 8, wherein the second supporting body has a plate shape.

10. The inertial force sensor according to claim 6, wherein the first supporting body has a plate shape.

* * * * *